(12) United States Patent
Brock et al.

(10) Patent No.: US 9,273,536 B2
(45) Date of Patent: Mar. 1, 2016

(54) SUBSEA INTERVENTION SYSTEM

(71) Applicant: HELIX ENERGY SOLUTIONS GROUP, INC., Houston, TX (US)

(72) Inventors: Steven Brock, Westhill (GB); Colin Johnston, Houston, TX (US)

(73) Assignee: Helix Energy Solutions Group, Inc., Houston, TX (US)

( * ) Notice: Subject to any disclaimer, the term of this patent is extended or adjusted under 35 U.S.C. 154(b) by 0 days.

(21) Appl. No.: 14/313,777

(22) Filed: Jun. 24, 2014

(65) Prior Publication Data

US 2014/0374114 A1 Dec. 25, 2014

Related U.S. Application Data

(60) Provisional application No. 61/838,649, filed on Jun. 24, 2013.

(51) Int. Cl.
| | |
|---|---|
| *E21B 41/00* | (2006.01) |
| *H02J 4/00* | (2006.01) |
| *E21B 33/035* | (2006.01) |
| *E21B 33/076* | (2006.01) |
| *E21B 34/16* | (2006.01) |
| *E21B 43/12* | (2006.01) |

(52) U.S. Cl.
CPC ......... *E21B 41/0007* (2013.01); *E21B 33/0355* (2013.01); *E21B 33/076* (2013.01); *E21B 34/16* (2013.01); *E21B 43/12* (2013.01); *H02J 4/00* (2013.01)

(58) Field of Classification Search
CPC ............ E21B 41/0007; E21B 33/0355; E21B 33/076; E21B 33/064; E21B 34/02; E21B 47/11025; G05B 17/02

USPC .................................................. 166/363, 364
See application file for complete search history.

(56) References Cited

U.S. PATENT DOCUMENTS

| | | | |
|---|---|---|---|
| 8,781,743 B2* | 7/2014 | McKay et al. ..................... 702/6 |
| 8,886,504 B2* | 11/2014 | Standifird et al. ............... 703/10 |
| 2008/0264642 A1* | 10/2008 | Horton ........................... 166/341 |
| 2008/0264649 A1* | 10/2008 | Crawford ...................... 166/381 |
| 2009/0273479 A1* | 11/2009 | Waugh .......................... 340/584 |
| 2009/0288836 A1* | 11/2009 | Goodall et al. ................ 166/336 |
| 2011/0061861 A1* | 3/2011 | Flanders ................... 166/250.01 |
| 2012/0197527 A1* | 8/2012 | McKay et al. ..................... 702/6 |
| 2012/0312545 A1* | 12/2012 | Suryanarayana et al. ..... 166/369 |
| 2012/0317058 A1* | 12/2012 | Abhulimen ....................... 706/2 |
| 2013/0092384 A1* | 4/2013 | Mathis .......................... 166/336 |
| 2013/0327534 A1* | 12/2013 | Christie et al. ................ 166/345 |
| 2014/0231090 A1* | 8/2014 | Sundararajan et al. ....... 166/345 |
| 2014/0305656 A1* | 10/2014 | Salen et al. ................... 166/351 |
| 2015/0094866 A1* | 4/2015 | Pereira et al. ................ 700/282 |

* cited by examiner

*Primary Examiner* — James G Sayre
(74) *Attorney, Agent, or Firm* — Locke Lord LLP

(57) ABSTRACT

A subsea intervention system including at least one control station, at least one programmable logic controller system in each control station, at least one supervisory control and data acquisition system, at least one safety system capable of interacting with each control station, wherein the safety system is capable of controlling a process shutdown process, an emergency shutdown process, and an emergency quick-disconnect process. The system may also include subsea distribution units, safety manifold subsea control modules, system hydraulic power units, client hydraulic power units, grease skids, flushing and chemical injection units, or umbilical reelers.

10 Claims, 5 Drawing Sheets

SUBSEA INTERVENTION SYSTEM

CROSS REFERENCE TO RELATED APPLICATIONS

This nonprovisional application for patent claims priority to, and hereby incorporates by reference, U.S. Provisional Application Ser. No. 61/838,649, entitled "Subsea Intervention System Controls for use with Riser Based and Riserless Systems," filed Jun. 24, 2013.

BACKGROUND OF THE INVENTION

1. Technical Field of Invention

The invention disclosed and taught herein relates generally to a system and method of use of intervention system controls in subsea environments with riser based and riserless systems.

2. Description of Related Art

Intervention systems are used to allow for subsea installation and retrieval and for well intervention operations to be performed. Intervention operations include diagnosis, monitoring, and enhancement of a well's performance. Therefore, a need exists to be able to provide wireline tools to be deployed into the well, to carry out intervention operations in both riserless and riser configurations, and to intervene in those operations.

SUMMARY OF THE INVENTION

The intervention system is a well control system deployed and connected to a subsea tree to create an environmental barrier, with pressure integrity which will allow tooling to be deployed into the well, whilst the well control equipment and wireline tools are controlled from surface. The tools are retrievable to surface to change/maintain tooling.

The intervention system provides pressure integrity from the subsea tree and well to the surface vessel pressure containing equipment. The riser allows passage of downhole wireline tools or coil tubing. This system configuration allows for pumping, circulating, and displacement operations from subsea to surface.

Both systems shall have a common Lower Riser Package ("LRP") providing a means of safe well control, providing primary and secondary barriers which have the ability to shut in and cut and seal once on either wireline or coil tubing.

The system shall be fitted with an Emergency Disconnect Package allowing the Upper package ("EDP") to disconnect from the lower riser package (LRP) during adverse weather, vessel operations safety or routine operations, whilst retaining all fluids within. The surface equipment shall be capable of operations for safely transporting, storing, deploying and retrieving subsea intervention equipment within the vessels operational envelope.

The invention serves to provide a means of control of subsea components being employed to facilitate subsea well operations requiring entry, operation, and withdrawal from a subsea well. The system maintains a means of control of the subsea well during operations and enables both routine and emergency operation of the existing subsea production tree, where applicable, as well as the subsea intervention system whether in riser or riserless mode.

The invention may include a safety system that can be stand-alone, separated from other control systems, including monitoring and control systems ("MCS") or other third party systems. The interfaces to emergency shutdown ("ESD") push-button stations, repeater lamps panels, subsea safety manifold, and third party panels can use dedicated signals.

The dedicated emergency shutdown signals will preferably be constantly energized from A-side and B-side at all times during the normal operation. A two out of two voting system will preferably be applied in both the safety system and third party systems. Single failure of signals, from A-side or B-side, shall preferably not initiate any emergency shutdown functions.

In a preferred embodiment, the invention may include a redundant safety programmable logic controller ("PLC") system, a dual-cable topology for input/output ("I/O") communication, a local human machine interface ("HMI") that provides visual indication of initiated inputs and activated outputs and audible alarms, a dedicated emergency shutdown signals towards other systems. The dedicated emergency shutdown signal may further include a plurality of safety relays including A-side and B-side I/O racks, a plurality of alarm indication panels with indicators for execution of production Shutdown ("PSD"), Emergency Shutdown ("ESD") and Emergency Quick Disconnect ("EQD") and inhibit alarms, two I/O stations with digital multimeter modules for subsea circuit monitoring, two fiber optic connections to supervisory control and data acquisition ("SCADA") for emergency shutdown alarms, events and diagnostic information, dual independent power supplies may be provided to two off uninterruptible power supply ("UPS") units for the safety system.

In a preferred embodiment, the subsea intervention system includes at least one control station, at least one programmable logic controller system in each control station, at least one supervisory control and data acquisition system, at least one safety system capable of interacting with each control station, wherein the safety system is capable of controlling a process shutdown process, an emergency shutdown process, and an emergency quick-disconnect process. The system may also include subsea distribution units, safety manifold subsea control modules, system hydraulic power units, client hydraulic power units, grease skids, flushing and chemical injection units, umbilical reelers, cabins with a topside grease racks, surface power generators, grease injection units, workover umbilicals, a multi-quick connectors, umbilical sheaves, subsea intervention control modules, subsea monitoring units, subsea software, local stations, remote stations, hydrostatic pressure isolated electronics modules, control pods, safety system panels, pump systems, client hydraulic power unit panels, subsea intervention lubricator hydraulic power unit panels, flushing chemical injection panels, redundant safety programmable logic controller systems, and/or topside networks.

In a preferred method of using this system, the steps may include receiving information from the valves, controlling the valves, monitoring the valves, and initiating at least one emergency disconnect sequence, wherein the emergency disconnect sequence comprises disconnecting a surface control assembly from a subsea control assembly. The method may also include detecting emergency shutdown signals from at least one manual input device or an interfaced system, processing at least one output signals, and shutting down or activating at least one device, wherein the emergency shutdown sequence may be initiated at a surface via an emergency-stop push-button from an emergency shutdown station or by an autonomous emergency shutdown function.

DESCRIPTION OF THE DRAWINGS

The foregoing and other aspects of the disclosed embodiments will become apparent from the following detailed description and upon reference to the drawings, wherein.

DESCRIPTION OF DISCLOSED EMBODIMENTS

The drawings described above and the written description of specific structures and functions below are presented for illustrative purposes and not to limit the scope of what has been invented or the scope of the appended claims. Nor are the drawings drawn to any particular scale or fabrication standards, or intended to serve as blueprints, manufacturing parts list, or the like. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual, real-world commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention or the appended claims.

Figure 1:
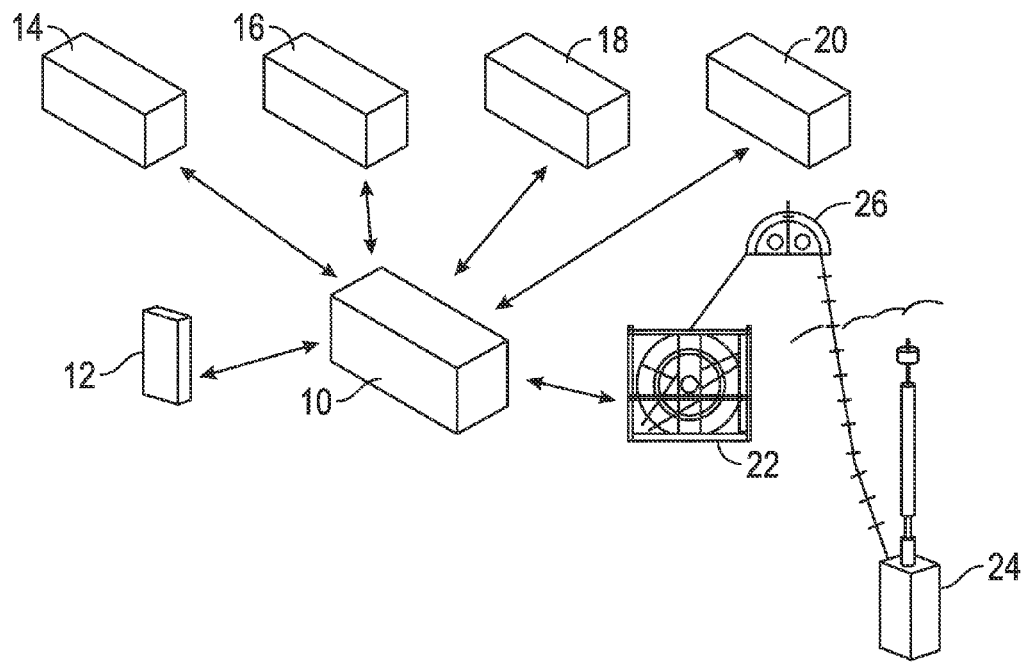
FIG. 1 is a diagram showing elements of overview of the system configuration.

FIG. 1 provides a simplified overview of the system configuration and the means by which overall control from surface equipment, located on the intervention vessel, is transmitted to the subsea equipment. The master control station or control station ("MCS") 10 may include a cabin with a topside grease rack. The safety system 12, which is in a safe area of a vessel, interacts with the MCS 10. The system hydraulic power unit ("HPU") 14, the client HPU 16, the grease skid 18 if required, and the flushing and chemical injection unit 20 interact with the MCS 10. The MCS 10 also interacts with the umbilical reeler 22, which connects to the subsea stack 24 via a reeler 26. The SCADA system in the MCS 10 used to control the mode of operation and interlock signals are sent to the surface/subsea systems based on the operation mode.

The control system will provide the ability to supply, control, and monitor various valves on the intervention system plus initiation of programmed emergency disconnect sequences, including surface and subsea control assemblies interconnected by an umbilical assembly. The surface control and instrumentation with a local control station, a remote control station, an emergency shutdown panel, test and auxiliary equipment, and surface software. The surface power generation may include electrical power units, hydraulic power units, chemical injection/flushing units, and grease injection unit. The surface power storage including an uninterruptable power supply. The distribution may include a workover umbilical, a multi-quick connector, an umbilical reel, and umbilical sheaves. The subsea may include subsea intervention control module, subsea monitoring, and subsea software. The subsea power storage may include subsea accumulators. The subsea interfaces may include a client tree.

The surface control assembly will include the MCS 10, which will house PLC systems. The MCS 10 will also include local and remote stations, wherein the remote stations can be installed in designated locations throughout the vessel for remote operations of the intervention system. The MCS 10 can be connected to an independent ship's network. The subsea control assembly may include hydrostatic pressure isolated electronics modules, control pods, which interface with hydraulic manifolds. The subsea control assembly, along with various monitoring sensors are mounted to the subsea intervention package.

Software will control and monitor the system, along with predetermined sequence timing and fail-safe operations. The application of the software is to sequence on/off functions to the various directional control valves within the manifolds. A SCADA system will provide a standard user interface for all SIL and topside screens.

The controls safety system, sometimes referred to as a dead man system, can be a separate system controlling Process shutdown ("PSD"), Emergency shutdown ("ESD") and Emergency quick-disconnect ("EQD").

Subsea control and instrumentation includes subsea intervention control module. The subsea control module will control and operate workover and intervention functions on the emergency disconnect ("ED")/lower riser package ("LRP") riser package and subsea tree and downhole functions.

The workover control module will be designed to be suitable for open water riser and riserless mode operations including operating temperatures, ambient pressure, shock, impact and vibration loads generated during transportation, handling on pipe deck and drill floor, drill floor function testing, running and retrieval through the splash zone and during storm hang-off.

The subsea intervention control module may include features such as: operational consequences and overall safety principles fail-safe state shall be defined for the control module's functions in their different operational modes, for example fail-as-is on loss of electric power/communication and fail-close on loss of hydraulic pressure; loss of electrical power and/or communication and/or hydraulic pressure to the control module shall not adversely affect the system's ability to secure the well by using other system functions; a double barrier philosophy against seawater intrusion; required operation of the control module shall be included in the required emergency shutdown and emergency disconnect response times; all active electronic circuits shall have an enclosure designed compatible with full external pressure conditions; each hydraulic supply and function line shall be internally monitored by pressure transducers; hydraulic supply line flow should and function line flow can be internally monitored by flow meters; the control module shall be capable of providing feedback to topside system in order to verify correct execution of commands; and/or leakage in the hydraulic or chemical section of the system shall not impact the integrity of the electric/electronic system.

The software may include: software structured in functional tasks or modules, which is designed, coded and tested as independent units such that these modules typically conform to the defined tasks, including interrupt tasks in the real-time operating system, or the main program calls in a real-time monitor if a simple sequential scan is used; software module and overall software structure designed to make later software updating and maintenance easy to control and perform; software with built-in diagnostic functions to simplify testing and debugging of communication units, logic and processing units plus sensors; software designed to allow for reprogramming from the surface while in place subsea when considerations are given to operational safety aspects and proper testing while subsea; system design with a governing end of the communication link between the topside and the subsea software, both for normal and safety rated operation; each message shall have cyclic redundancy check or a similar type, leaving no possibility for faulty messages to be received and interpreted as correct; and/or electrical and optical communication performance shall meet a "bit error rate" requirement preferably less than $1 \times 10^{-6}$ electrical communication performance and most preferably less than $1 \times 10^{-8}$ optical communication performance, respectively.

The safety system, a direct hard wired system, preferably includes an engineered set of hardware and software controls which are especially used on critical process systems. A process system can be identified as one which, once running and an operational problem occurs, the system may need to be put into a "safe state" to avoid adverse Health, Safety, and Environmental ("HS&E") consequences.

The safety system may supervise the process system and in the event of any defined emergency situations, it shall implement pre-determined emergency shutdown functions/sequences to failsafe or maintain safe operation of the process to prevent or minimizes the consequences of emergency situations, help to protect/avoid loss of human life, damage to the environment, and/or loss of equipment.

The safety system should be independent from all other control systems that control the same equipment in order to ensure safety functionality is not compromised. A safety system is composed of the same types of control elements (including sensors, logic solvers, actuators and other control equipment) as a Basic Process Control System ("BPCS"). However, all of the control elements in a safety system are dedicated solely to proper safety-related function.

The safety system may include the helpful functions for automatic shutdown and disconnection of modules by activation from surface E-stop push-button stations. Three levels of shutdown may be provided: Production Shutdown ("PSD"), Emergency Shutdown ("ESD"), and Emergency Quick Disconnect ("EQD"). The timing of each individual function included in these automatic operations shall ensure that hazardous situations do not occur. The safety system may be designed to perform an emergency shutdown within an acceptable response time based on a total assessment of the possible emergency situations and the consequences of such situations.

Figure 2:
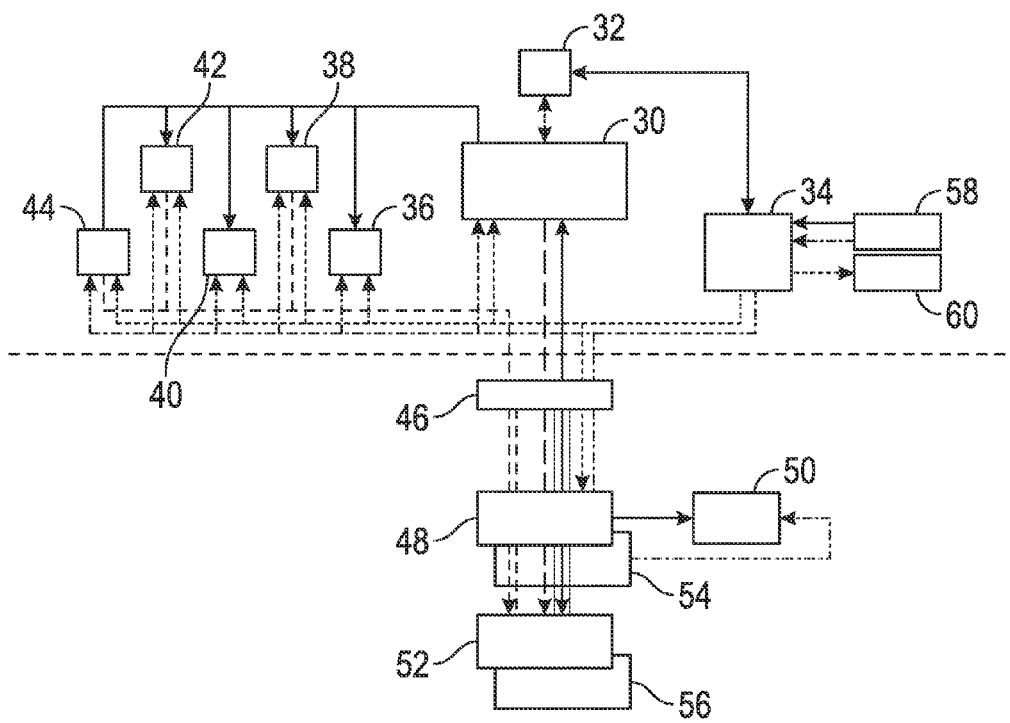
FIG. 2 is a schematic view showing control system architecture.

FIG. 2 shows control system architecture overview. As shown, a master control station ("MCS") panel 30 is in communication with a SCADA computer 32. The MCS 30 is hard wired to a safety system panel 34, pump systems 36, client HPU panel 38, grease system 40, subsea intervention lubricator ("SIL") HPU panel 42, flushing chemical injection ("CI") panel 44, umbilical 46, and subsea distribution unit A side 48 via umbilical 46, which is hard wired to subsea ESD manifold 50. Of note, a MCS panel 30 is optical fiber linked to pump systems 36, client HPU panel 38, grease system 40, SIL HPU panel 42, flushing CI panel 44, umbilical 46, and subsea distribution unit A side 48. There are hydraulic lines between pump systems 36, client HPU panel 38, grease system 40, SIL HPU panel 42, flushing CI panel 44, umbilical 46, and subsea distribution unit A side 48 via umbilical 46, subsea control modules A side 52. The safety system panel 34 is connected to subsea control module A side 52 and subsea distribution unit B side 54 and subsea control module B side 56 by subsea power links. The subsea distribution unit B side 54 is hard wired to the subsea ESD manifold 50 also. The safety system panel 34 is hard wired to WSD PB panel 58 and indicator panels 60 also.

When implemented, the MCS 30, the SCADA computer 32, the safety system panel 34, the pump systems 36, the client HPU panel 38, the grease system 40, the SIL HPU panel 42, the flushing CI panel 44, the WSD PB panel 58, and the indicator panels 60 are above the surface. The umbilical 46, the subsea distribution unit A side 48, the subsea ESD manifold 50, the subsea control modules A side 52, the subsea distribution unit B side 54, and the subsea control module B side 56 are subsea.

The safety system panel 34 with the ESD PB panels 58 and the indicator panels 60 are preferably stand-alone, separated from other control systems, such as the MCS 30 or other third party system. The interfaces to ESD push-button stations, repeater lamps panels, subsea safety manifold and third party panels will use dedicated signals. The dedicated emergency shutdown signals shall be constantly energized from A-side and B-side at all times during the normal operation. Two out of two voting systems shall be applied in both the safety system and third party systems. Single failure of signals, from A-side or B-side, may not initiate any emergency shutdown functions.

The safety system may include a redundant safety PLC system, including CPU racks and I/O racks, to detect the emergency shutdown signals from the manual input devices and the interfaced systems, and process output signals to devices that shall be shut down or activated. The system may also include dual-cable topology shall be used for the I/O communication; a local human machine interface ("HMI") provides visual indication of initiated inputs and activated outputs and audible alarms. The safety system may also include hard wired emergency shutdown signal towards other systems; safety relays such as A-side and B-side I/O racks; alarm indication panels with indicators for PSD/ESD/EQD and inhibit alarms; I/O stations with digital multimeter modules for subsea circuit monitoring (A&B); fiber optic connections to MCS SCADA for emergency shutdown alarms, events and diagnostic information; power supplies; PSUs for surface signals/devices; adjustable PSUs for subsea solenoid valves; and/or dual independent power supplies provided to UPS units for the safety system.

Figure 3:
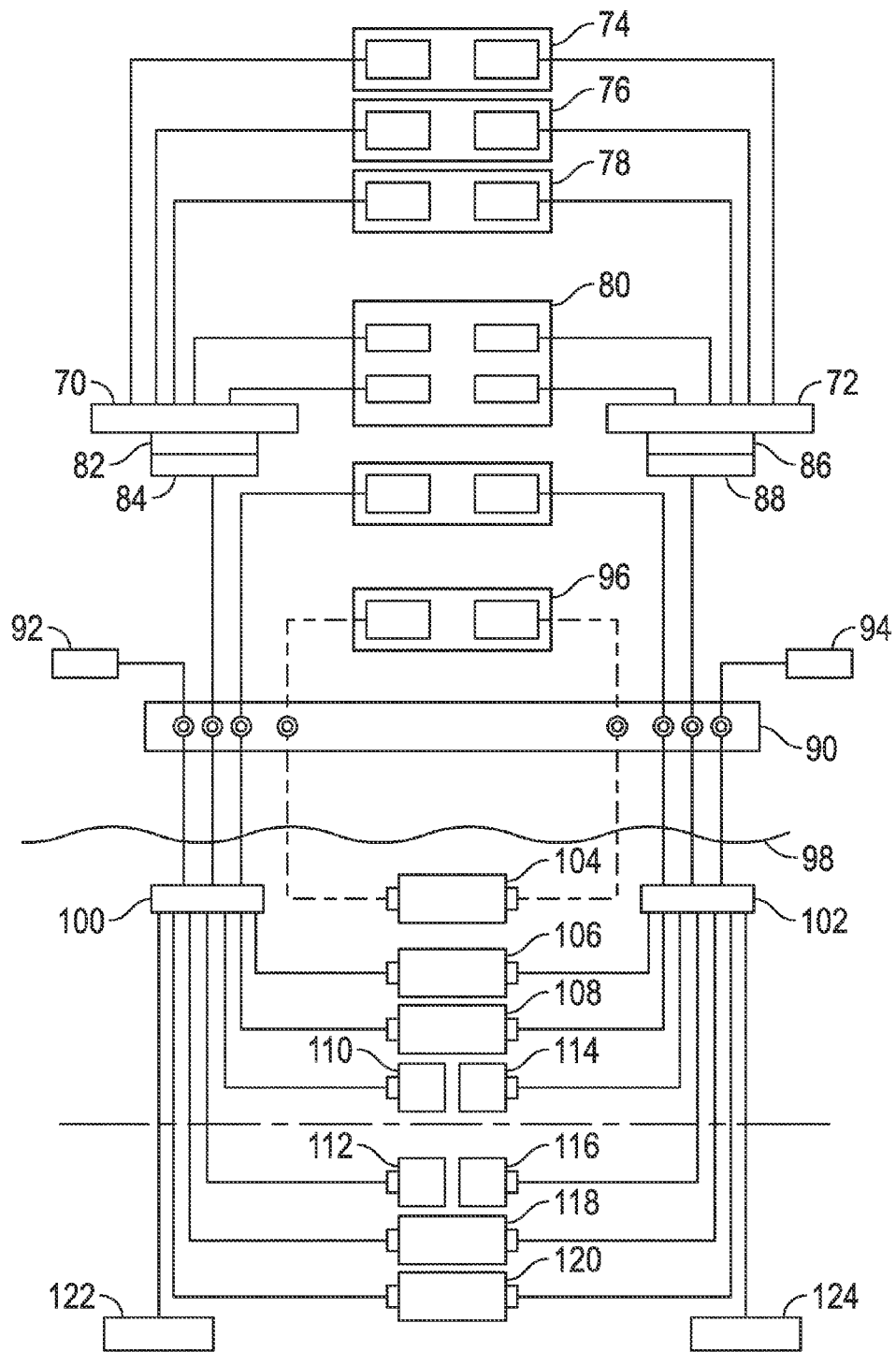
FIG. 3 is a schematic view showing control system redundancy overview.

FIG. 3 shows a diagram of the control system redundancy. Above the surface 98, topside network A 70 and topside network B 72 are hard wired to a client HPU NB 74, a system HPU NB 76, a chemical injection NB 78, and operator stations NB 80. The operator stations NB may include remote operator station that is vessel specific NB and local operator stations MCS NB. Topside network A 70 and topside network B 72 are connected to PLC1A primary 82 and subsea network 84 and to PLC1B primary 86 and subsea network 88, respectively. The subsea networks 84 and 88 connect to the umbilical reeler 90. The umbilical reeler 90 is also connected to client A 92, client B 94, and safety system NB 96.

Below the surface 98, the umbilical reeler 90 is connected to a subsea distribution unit A 100, a subsea distribution unit B 102, and a safety manifold subsea control module 104. The subsea distribution unit A 100 and the a subsea distribution unit B 102 are connected to a subsea control module 106, a second subsea control module 108, a third subsea control module 118, and a fourth subsea control module 120. The subsea control module 106 and the second subsea control module 108 may include subsea electronic modules.

The subsea distribution unit A 100 is also connected to an instrument junction box A 110, a second instrument junction box A 112, and a subsea client interface A 122 while the subsea distribution unit B 102 is connected to an instrument junction box B 114, a second instrument junction box B 116, and a subsea client interface 124.

The emergency shutdown functions (PSD, ESD or EQD) shall be initiated at the surface via an emergency-stop pushbutton from the emergency shutdown station or by autonomous emergency shutdown functions: PSD capable of providing isolation of the vessel process equipment; ESD capable of providing a sequential establishment of the barrier elements, wherein PSD may activate ESD automatically; EQD capable of sequential establishment of the barrier elements followed by disconnection at a level above the top barrier wherein EQD can trip PSD and EQD automatically; autonomous PSD/ESD/EQD capable of the same effects as PSD/ESD/EQD above when the safety system detects the failures of subsea circuits; and/or uncontrolled EQD, which has the same effects as EQD above, when the safety system detects the stab plate pin sheared.

The safety system shall have dedicated emergency shutdown signals. Meanwhile, the safety system shall provide network interface to allow the operator to monitor the safety system operation and health status remotely, as well as any necessary alarm and events acknowledgements.

Two Remote I/O racks with identical input/output modules' configuration, named 'A-side' and 'B-side' shall be provided to accept redundant I/O signals from emergency shutdown PB stations, and send them to subsea safety manifold and third party system panels on surface for emergency shutdown functions.

Figure 4:
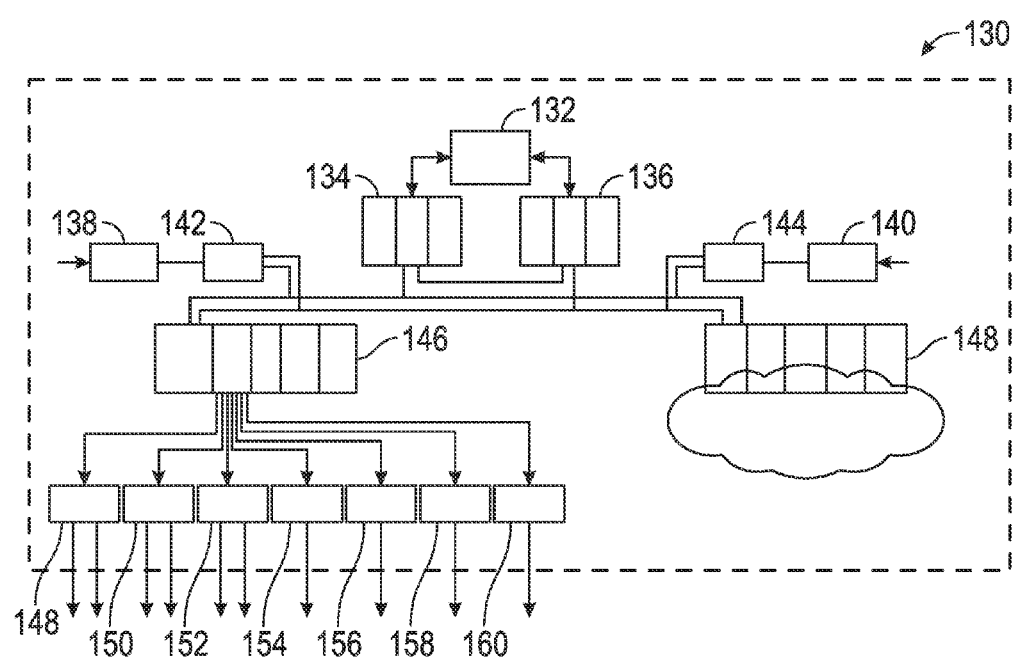
FIG. 4 is a schematic view showing safety related input output wiring.

FIG. 4 shows a typical safety-related I/O wiring diagram. As shown, the safety PLC enclosure 130 includes a HMI 132 that communicates to CPU PLC-A 134 and CPU PLC-B 136, respectively. CPU PLC-A 134 and CPU PLC-B 136 are connected to each other and to subsea circuits A side 138 and subsea circuits B side 140 via Y links 142 and 144, respectively. In FIG. 3, the A-side I/O rack 146 is illustrated and the B-side I/O rack 148 abbreviated, but those skilled in the art recognize that both sides are redundant.

The A-side I/O rack 146 connects to PSD safety relay 148, ESD safety relay 150, EQD safety relay 152, EQD safety relay 154, ESD+EQD safety relay 156, PSD+ESD+EQD safety relay 158, and PSD+ESD+EQD safety relay 160. PSD safety relay 148 connects to subsea solenoid valves and the MCS. ESD safety relay 150 connects to subsea solenoid valves and the MCS. EQD safety relay 152 connects to subsea solenoid valves and the MCS. EQD safety relay 154 connects to SIL/client HPUs. ESD+EQD safety relay 156 connects to grease system. PSD+ESD+EQD safety relay 158 connects to CI/flushing skid. PSD+ESD+EQD safety relay 160 connects to vessel and third party pumps.

The dedicated ESD signals (PSD/ESD/EQD) to third party systems on the surface may be redundant and connected from A-side and B-side I/O rack in safety PLC enclosure to third party PLC systems. Two separated multicore cables shall be provided for A-side and B-side signals from the safety PLC panel to each third party system.

Figure 5:
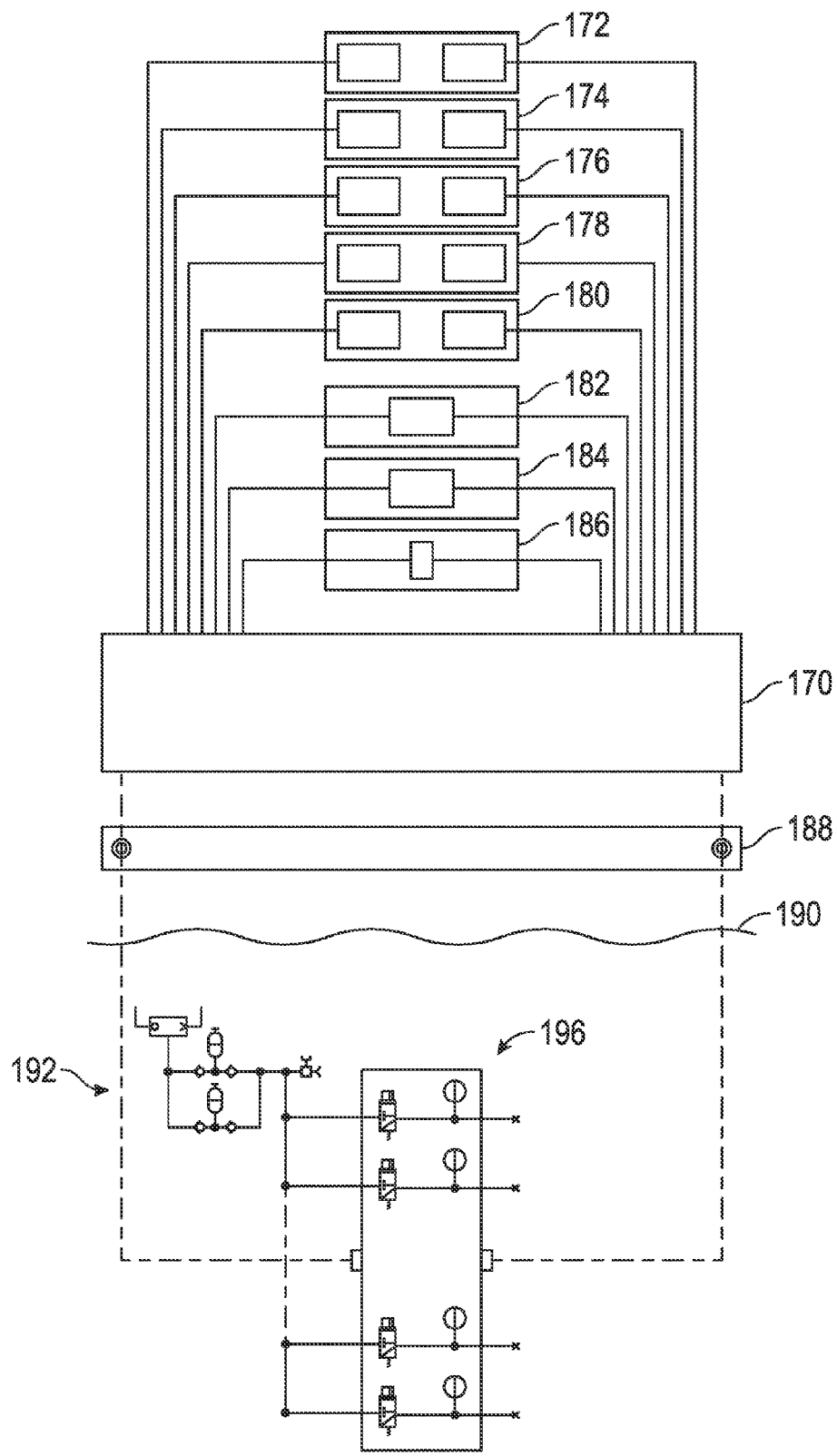
FIG. 5 is a schematic view showing safety system redundancy overview.

FIG. 5 shows a safety system redundancy overview. Above the surface, 190, a safety system rack 170 may include safety relays, input/output connections, CPUs, and similar components. The safety system rack 170 is connected redundantly to vessel and third party pumps NB 172, CT unit NB 174, client HPU NB 176, system HPU NB 178, chemical injection/flush system NB 180, pushbutton station 182 usually containing PSD, ESD, and EQD, pushbutton station 184 usually containing PSD, ESD, and EQD, and pushbutton station 186 usually containing EQD. The safety system rack 170 is also connected redundantly to the umbilical reeler 188.

Below the surface 190 in the EDP 192, a hydraulic power supply is shown powering safety manifolds 196. These electrically energized digital valve controllers in the manifolds 196 may have preset delays as required.

Figure 6:
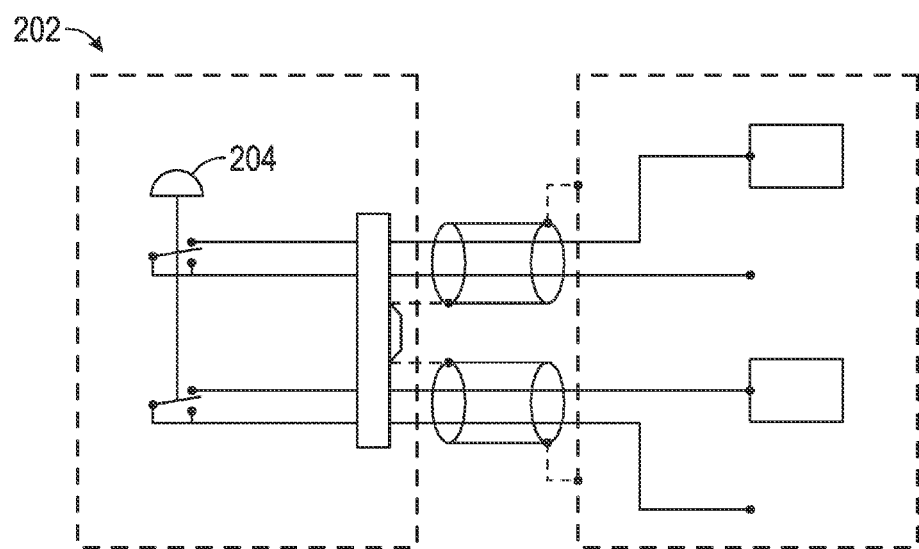
FIG. 6 is an embodiment of a circuit diagram for signals to third party systems.

FIG. 6 shows a diagram of a typical circuit diagram for PSD, ESD or EQD input signal. A safety enclosure is shown in conjunction with a third party systems enclosure 202. In the third party systems enclosure 202, an emergency stop pushbutton station 204 is shown. The safety PLC shall monitor the subsea circuits current/voltage for autonomous PSD/ESD/EQD and uncontrolled EQD functions and alarms. Each emergency shutdown signal, PSD, ESD or EQD, shall have two separated circuits, A-side and B-side. Each circuit will be connected to the same subsea dual-coil solenoid valve. Alarms shall be generated on local HMI and remote MCS SCADA while any circuits have been detected as 'open circuit' conditions. Two power supply units' output voltage shall also be monitored and alarm shall be signaled on HMI and MCS SCADA if the output voltages below a setting point. The Autonomous PSD/ESD/EQD functions shall be able to be inhibited by the local inhibit key switch.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A subsea intervention system comprising:
   at least one control station;
   at least one programmable logic controller system in each control station;
   at least one supervisory control and data acquisition system; and
   at least one safety system connected to each control station;
   wherein the safety system is capable of controlling a process shutdown process, an emergency shutdown process, and an emergency quick-disconnect process.

2. The subsea intervention system of claim 1 wherein the subsea safety systems comprises a plurality of subsea distribution units and a plurality of safety manifold subsea control modules.

3. The subsea intervention system of claim 1 further comprising:
   a workover umbilical.

4. The subsea intervention system of claim 1 further comprising:
   at least one subsea intervention control module.

5. The subsea intervention system of claim 1 further comprising a local station and at least one remote station.

6. The subsea intervention system of claim 5 wherein the remote stations can be are installed in designated locations for at least one remote operation of the subsea intervention system.

7. The subsea intervention system of claim 1 further comprising a subsea control assembly, wherein the subsea control assembly comprises at least one hydrostatic pressure isolated electronics module and at least one control pod.

8. The subsea intervention system of claim 1 further comprising:
- a safety system panel;
- at least one pump system;
- at least one client hydraulic power unit panel;
- at least one subsea intervention lubricator hydraulic power unit panel; and
- at least one flushing chemical injection panel.

9. The subsea intervention system of claim 1 wherein the safety system comprises a redundant safety programmable logic controller system.

10. The subsea intervention system of claim 1 further comprising a plurality of topside networks connected to a the client hydraulic power units and the system hydraulic power units.

* * * * *